United States Patent
Chen et al.

(10) Patent No.: US 11,227,434 B2
(45) Date of Patent: Jan. 18, 2022

(54) MAP CONSTRUCTING APPARATUS AND MAP CONSTRUCTING METHOD

(71) Applicant: Delta Electronics, Inc., Taoyuan (TW)

(72) Inventors: Yu-Ta Chen, Taoyuan (TW); Yi-Ting Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 70 days.

(21) Appl. No.: 16/554,287

(22) Filed: Aug. 28, 2019

(65) Prior Publication Data

US 2020/0167993 A1  May 28, 2020

(51) Int. Cl.
  *G06T 17/05* (2011.01)
  *G06K 9/00* (2006.01)
  *G01C 21/32* (2006.01)
  *G06K 9/62* (2006.01)

(52) U.S. Cl.
  CPC .............. *G06T 17/05* (2013.01); *G01C 21/32* (2013.01); *G06K 9/00664* (2013.01); *G06K 9/6202* (2013.01); *G06T 2210/12* (2013.01)

(58) Field of Classification Search
  CPC ..... G06T 17/05; G06T 2210/12; G01C 21/32; G06K 9/00664; G06K 9/6202
  See application file for complete search history.

(56) References Cited

U.S. PATENT DOCUMENTS

| 8,401,225 | B2 * | 3/2013 | Newcombe | G06T 7/194 |
| | | | | 382/100 |
| 9,639,943 | B1 * | 5/2017 | Kutliroff | G06T 7/55 |
| 2011/0227914 | A1 | 9/2011 | Varekamp et al. | |

(Continued)

FOREIGN PATENT DOCUMENTS

| CN | 107209853 A | 9/2017 |
| JP | H05334434 A | 12/1993 |

(Continued)

OTHER PUBLICATIONS

Chow, Indoor Tracking, Mapping, and Navigation—Algorithms, Technologies, and Applications—Journal of Sensors vol. 2018, Article ID 5971752, 3 pages (Year: 2018).*

(Continued)

*Primary Examiner* — Phuc N Doan
(74) *Attorney, Agent, or Firm* — Chun-Ming Shih; HDLS IPR Services

(57) ABSTRACT

A map constructing method adopted by a map constructing apparatus and includes steps of: continually obtaining colored image and depth-image information by an image sensor and a depth sensor of the map constructing apparatus while the map constructing apparatus is moving; recognizing the colored image for determining whether a dynamic object exists; labelling an object area corresponding to the location of the dynamic object if the dynamic object exists in the colored image; mapping the object area to a depth-image coordinate adopted by the depth-image information, searching for a corresponding position of the object area in the depth-image information and filtering the object area from the depth-image information for generating an adjusted depth-image information; and, inputting the adjusted depth-image information to a map constructing algorithm for establishing map data.

18 Claims, 13 Drawing Sheets

(56) References Cited

U.S. PATENT DOCUMENTS

| | | | |
|---|---|---|---|
| 2014/0005933 A1 | 1/2014 | Fong et al. | |
| 2016/0144505 A1* | 5/2016 | Fong | B25J 9/1697 |
| | | | 700/250 |
| 2018/0012105 A1 | 1/2018 | Fan et al. | |
| 2018/0075643 A1* | 3/2018 | Sequeira | G01S 17/89 |
| 2018/0225539 A1* | 8/2018 | Fathi | G06T 7/55 |
| 2018/0314911 A1 | 11/2018 | Eldar et al. | |
| 2018/0315007 A1* | 11/2018 | Kingsford | G06T 7/97 |
| 2019/0197778 A1* | 6/2019 | Sachdeva | G06T 17/05 |
| 2020/0114509 A1 | 4/2020 | Lee et al. | |

FOREIGN PATENT DOCUMENTS

| | | | |
|---|---|---|---|
| JP | 2014203429 | * | 10/2014 |
| JP | 2014203429 A | | 10/2014 |
| JP | 2015519677 A | | 7/2015 |
| JP | 2018119833 A | | 8/2018 |
| TW | 201030672 A | | 8/2010 |
| WO | 2018230852 A1 | | 12/2018 |
| WO | 2018179649 A1 | | 11/2019 |

OTHER PUBLICATIONS

Khoshelham et. al., Indoor mapping, modeling and localization Survey, URL: https://www.researchgate.net/project/Indoor-mapping-modeling-and-localization (Year: 2020).*

Ramey, (Vision-based people detection using depth information for social robots: An experimental evaluation), International Journal of Advanced Robotic Systems, Jun. 2017 (Year: 2017).*

Office Action dated Aug. 21, 2019 of the corresponding Taiwan patent application No. 107142375.

Search Report dated Dec. 27, 2019 of the corresponding Singapore patent application No. 10201902452W.

Office Action dated Jun. 16, 2020 of the corresponding Japan patent application No. 2019-048471.

Tomoya Mori et al., Implementation of SALM on Programmable SoCs for the Autonomous Robot, Proceedings of the 50th Annual Conference of the Institute of System, Control and Information Engineers (ISCIE), Kyoto, May 25-27, 2016, Section 1-3.

* cited by examiner

MAP CONSTRUCTING APPARATUS AND MAP CONSTRUCTING METHOD

BACKGROUND OF THE INVENTION

1. Field of the Invention

The invention relates to a map constructing apparatus and a map constructing method, and in particularly to a map constructing apparatus which includes an RGB-D device, and to a map constructing method implemented by the map constructing apparatus.

2. Description of Related Art

Recently, many of the mobile robots (such as automatic guided vehicle, AGV)) may be embedded with a map constructing apparatus. By using such map constructing apparatus, this kind of robots may build the map of the surrounding environment by themselves, and proceed to move and act according to the map they've built.

Generally speaking, most of the mobile robots in the market are applied with Lidar Simultaneous Localization and Mapping technology (LSLAM) or Visual Simultaneous Localization and Mapping technology (VSLAM) as the main map constructing solution. However, the aforementioned technologies may have a lot of restrictions and deficiencies in constructing the map, so the map currently constructed by the mobile robots is usually inaccurate enough.

More specific, as using the Lidar Simultaneous Localization and Mapping technology, a 2D lidar can only obtain the distance message at a fixed height in one-dimension, which cannot seize the condition of real environment, so it's hard to be used for building accurate maps. As using the Visual Simultaneous Localization and Mapping technology, this technology is commonly used for avoiding robots from obstacles and for simply measuring the distance, which is inadequate for being adopted in a map constructing procedure since it cannot exclude temporary objects from its measuring result.

As discussed above, if the above technologies are adopted by the map constructing apparatus, the map can only be built in a certain space which no dynamic object exists. If the map constructing apparatus is located in a space having the dynamic object (such as human, cars, etc.) or any other object which is not regularly existing in the space, the dynamic object will likely be encompassed in the built map. Therefore, the map built by the map constructing apparatus under the aforementioned technologies will be inaccurate, and will may affect the positioning function of the mobile robot when the mobile robot moves according to the inaccurate map.

For building an accurate map, the users nowadays have to clear the entire space out before the mobile robot moves in the space and constructs the map of the space. However, the above mentioned constructing method raises the difficulty in constructing the map and also the constructing cost.

SUMMARY OF THE INVENTION

The object of the present invention is to provide a map constructing apparatus and a map constructing method, which can improve the deficiencies of traditional map constructing apparatus and method in lack of environment sensitivity, and can strengthen the ability in object image detection and environment image recognition, so it can filter the dynamic object belonging to the foreground part and remain the environment image belonging to the background part while constructing the map.

In one of the exemplary embodiments, the map constructing method of the present invention is adopted by a map constructing apparatus and includes steps of: continually capturing a colored image through an image sensor and obtaining a depth-image information through a depth sensor after the map constructing apparatus is activated; performing an image recognition procedure to the colored image to determine whether a dynamic object exists in the colored image; labelling an object area on the colored image when the dynamic object exists in the colored image; mapping the object area to a depth-image coordinate adopted by the depth-image information; searching and filtering the object area from the depth-image information for generating an adjusted depth-image information; and importing the adjusted depth-image information to a map constructing algorithm for establishing map data.

In comparison with related art, the present invention can at least achieve the following technical effects:

(1) An RGB-D device is arranged on the map constructing apparatus (such as an image sensor in company with a depth sensor), so the recognition ability for environmental image of the map constructing apparatus is strengthened;

(2) A dynamic object or an object irregularly existing in the space can be detected and labeled from a colored image according to the strengthened ability;

(3) A background part (i.e., static space information) and a foreground part (i.e., the dynamic object or the irregularly-existing object) can be segmented from the colored image and the dividing result can be stored;

(4) Space information of map data can be improved through automatically amending or deleting information related to the dynamic object (such as depth information corresponding to the dynamic object) and remaining the background part while constructing the map and establishing the map data; and (5) A built map can be automatically updated whenever the map constructing apparatus moves according to the map and discovers that the environment has changed (for example, the location of the machines have changed, the decoration of the space has changed, etc.).

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
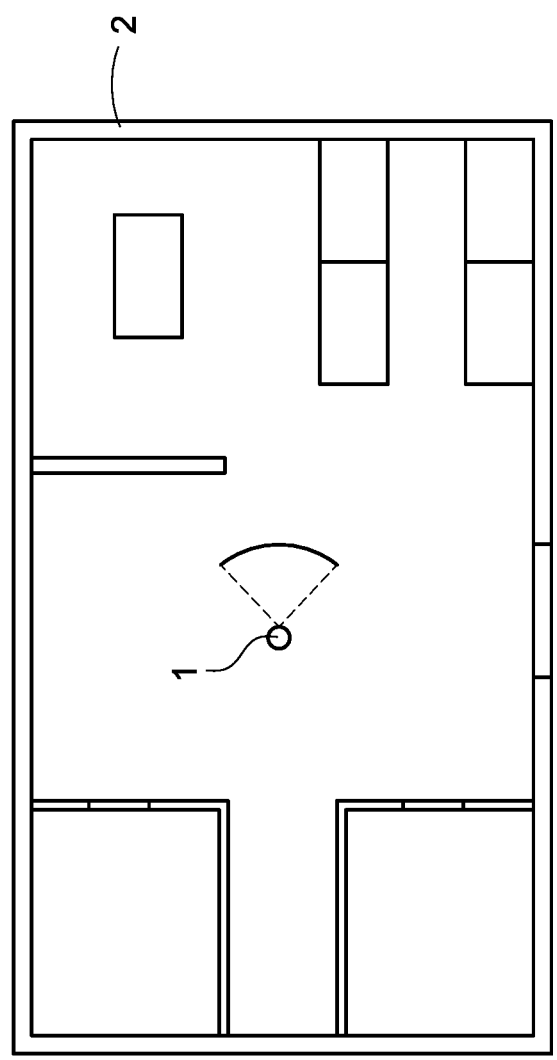
FIG. 1 is a schematic diagram showing the map constructing action according to a first embodiment of the present invention.

FIG. 1 is a schematic diagram showing the map constructing action according to a first embodiment of the present invention. As shown in FIG. 1, a map constructing apparatus 1 of the present invention is disclosed. The map constructing apparatus 1 can be arranged on a mobile robot (such as an automatic guided vehicle, AGV, not shown), for assisting the mobile robot in map constructing procedures.

When a mobile robot arranged with (internally embedded or externally connected) the map constructing apparatus 1 is located in an unknown space 2, it can construct the map of the space 2 by using the map constructing apparatus 1. In particular, when moving in the space, the mobile robot may detect images of the surrounding environment through the map constructing apparatus 1, so as to automatically build the map of the space 2 according to the detected images. By one or plurality times of movement, the map constructing apparatus 1 may establish map data which describes the plane space information (such as depth information) corresponding to the space 2. Therefore, when moving in the space 2 for executing tasks in the future, the mobile robot may move according to the pre-established map data, so as to exclude the potential problems while moving, for example, colliding with a machine, getting into a dead end, etc.

Figure 2:
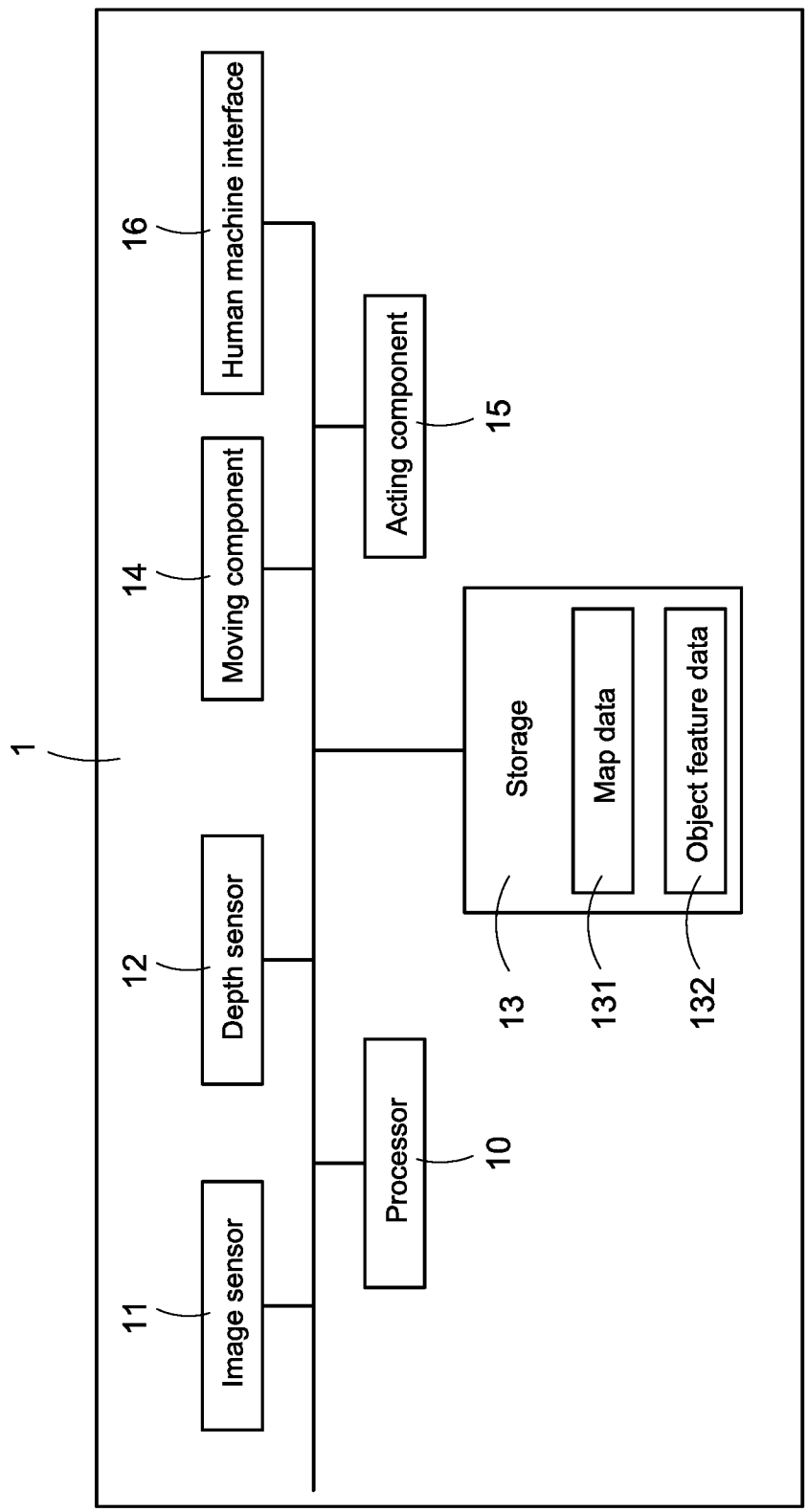
FIG. 2 is a block diagram of a map constructing apparatus according to a first embodiment of the present invention.

FIG. 2 is a block diagram of a map constructing apparatus according to a first embodiment of the present invention. As shown in FIG. 2, the map constructing apparatus 1 in the present invention at least includes a processor 10, an image sensor 11, a depth sensor 12 and a storage 13, wherein the image sensor 11, the depth sensor 12 and the storage 13 are electrically connected with the processor 10. In an embodiment, the processor 10 is electrically connected with the image sensor 11, the depth sensor 12 and the storage 13 through an internal bus, and the processor 10 is configured to execute at least one algorithm for accomplishing each demand and function of the map constructing apparatus 1 (detailed described as below). The algorithm is embedded in the map constructing apparatus 1 or input to the map constructing apparatus 1 from an external source, not limited thereto.

The map constructing apparatus 1 of the present invention implements the map constructing procedure and the map updating procedure through an RGB-D device (which is an RGB-Depth Map device). The RGB-D device is arranged inside the map constructing apparatus 1 or externally connected to the map constructing apparatus 1, not limited thereto. In a first embodiment, the RGB-D device may be configured as two separated devices including a first device for capturing colored image of the surrounding environment (i.e., an RGB image) and a second device for sensing depth information of the surrounding environment (i.e., depth information). In a second embodiment, the RGB-D device may be configured as an integrated image capturing device which can capture the colored image and also sense the depth information simultaneously. In the second embodiment, the map constructing apparatus 1 is unnecessary to be arranged with the separated image sensor 11 and depth sensor 12. In a third embodiment, the RGB-D device may be configured as the separated image sensor 11 and depth sensor 12 as shown in FIG. 2, wherein the image sensor 11 can be an RGB camera and the depth sensor 12 can be a lidar (i.e., light detection and ranging).

The above descriptions are only few of the exemplary embodiments of the present invention which are described in a non-limiting way. For the sake of understanding, the aforementioned image sensor 11 and depth sensor 12 as shown in FIG. 2 will be taken as an example for describing in the following sections.

In one embodiment, a user may directly activate the map constructing apparatus 1, otherwise the user may activate the aforementioned mobile robot for triggering the mobile robot to activate the map constructing apparatus 1 connected thereto. After the map constructing apparatus 1 is activated, the processor 10 of the map constructing apparatus 1 may control the image sensor 11 for continually capturing the colored image of the surrounding environment, and the processor 10 may also control the depth sensor 12 for continually sensing depth-image information of the surrounding environment.

In one embodiment, the processor 10 may recognise a dynamic object (such as a person, a machine vehicle, an animal, etc.) existing in the surrounding environment that should be excluded from an eventually-built map according to the colored image, and build a two-dimensional map which describes the geographic information of the surrounding environment according to the depth-image information. In another embodiment, the processor 10 may build a three-dimensional map which describes 3D geographic information of the surrounding environment according to both of the colored image and the depth-image information. For the sake of understanding, the two-dimensional map will be taken as an example for describing in the following sections.

After the map constructing apparatus 1 is activated, the processor 10 of the map constructing apparatus 1 may continually capture the colored image through the image sensor 11. In one embodiment, the processor 10 may execute a detecting algorithm for performing an image recognition procedure to the captured colored image. The detecting algorithm (not shown) is embedded inside the processor 10 or input to the processor 10 from an external source, and it is written by computer source code which is executable to the processor 10. When executing the detecting algorithm, the processor 10 is able to perform the image recognition procedure to the captured colored image through running the computer source code.

In particular, the processor 10 regards the captured colored image as an input parameter and imports the colored image to the detecting algorithm. Then, the detecting algorithm may reply to the processor 10 with an recognition result after finishing the image recognition procedure performed on the colored image, wherein the recognition result may indicate whether an recognizable dynamic object exists in the colored image or not. In other words, the recognition result indiates that whether the dynamic object is existing in the space 2 where the map constructing apparatus 1 is located or not.

Another technical feature of the present invention is that the map constructing apparatus 1 may detect a foreground part (i.e., the dynamic object) and a background part (i.e., a static space) while constructing the map, and the map constructing apparatus 1 may segment the content of the map into the foreground part and the background part and ensure that the foreground part will be excluded from the eventually-built map. If determining that at least one dynamic object is existing in the colored image according to the recognition result of the detecting algorithm, the processor 10 may label the dynamic object and creating a bounding box corresponding to the label dynamic object. Therefore, while the processor 10 performs a map constructing procedure for constructing the map according to another algorithm, the algorithm may search and recognise the bounding box and then excludes all information related to the bounding box from the eventually-built map (detailed discussed in the following).

As described above, the processor 10 performs the map constructing procedure for two-dimension image according to the depth-image information. After the bounding box is created, the processor 10 may regard a range of the bounding box as a region of interest (ROI), and the bounding box is mapped by the processor 10 to a depth-image coordinate adopted by the depth-image information. In one embodiment, the processor 10 may perform a transforming procedure based on a transforming algorithm, wherein the transforming procedure associates (or transforms) the position corresponding to the bounding box in the colored image to the depth image-coordinate of the depth-image information. It is worth saying that the colored image and depth-image information of this embodiment are preferably obtained at the same time (i.e., the time point of capturing the colored image is same as the time point of obtaining the depth-image information, or the time difference between these two time points is smaller than a tolerance).

After the above transforming procedure, the processor 10 may search for information related to the bounding box in the depth-image information (i.e., search for corresponding coordinates of the bounding box in the depth-image information), and the processor 10 may filter all information related to the bounding box from the depth-image information, so as to generate adjusted depth-image information. In one embodiment, the processor 10 may perform a filter algorithm for filtering the related information of the bounding box from the depth-image information and generating the adjusted depth-image information based on the filtered depth-image information. The filter algorithm may be embedded inside the processor 10 or input to the processor 10 externally from an outer source. In the present invention, the adjusted depth-image information only describes the information related to the static space which is belonging to the background part, so the adjusted depth-image information can be deemed as plane space depth information of the space 2 where the map constructing apparatus 1 is located.

Also, the processor 10 may perform a map constructing algorithm for establishing map data 131 according to the adjusted depth-image information. The map data 131 is used for describing the geographic information of the current space 2. The map constructing algorithm may be embedded inside the processor 10 or input to the processor 10 externally from an outer source. The processor 10 may store the established map data 131 in the storage 13. After being activated, the mobile robot arranged with the map constructing apparatus 1 may move and perform tasks in the space 2 according to the pre-established map data 131.

As shown in FIG. 2, the map constructing apparatus 1 may be integrated with the mobile robot as a unit, and the processor 10 of the map constructing apparatus 1 may be electrically connected with each component, such as a moving component 14, an acting component 15, a human machine interface (HMI) 16, etc. of the mobile robot. In one embodiment, the moving component 14 is the component which can assist the map constructing apparatus 1 to move, such as gears, wheels, transmission shafts, conveyors, etc. The acting component 15 is the component which can assist the map constructing apparatus 1 to perform tasks, such as motors, robotic arms, etc. The HMI 16 is the component which can assist the map constructing apparatus 1 to instruct other components or to display the map data 131, such as a monitor, a keyboard, a mouse, a touch panel, a voice control unit, etc. However, the above description is just a part of the exemplary embodiments of the present invention, not intended to narrow the scope of the present invention down to the above description.

In one embodiment of the present invention, the processor 10 may have one or more detecting algorithms (not shown), for example, Histogram of Oriented Gradient (HOG) feature extraction algorithm, Support Vector Machine (SVM) algorithm, Convolutional Neural Network (CNN) algorithm, You Only Look Once (YOLO) algorithm, Single Shot multibox Detector (SSD) algorithm or other object detecting algorithms that have been well-trained by neural network. The above algorithms may be applied to and used by the processor 10 individually or in combination, not limited thereto.

Before the map constructing apparatus 1 starts to be utilized, the processor 10 of the map constructing apparatus 1 may use the above algorithms individually or in combination to implement machine learning. In particular, the manufacturer of the map constructing apparatus 1 or the mobile robot may import a mass of recognition materials (such as photos or videos recording different types of dynamic objects) into the detecting algorithm for training thereto. As a result, the detecting algorithm may learn multiple object feature data 132 corresponding to different object types (such as human, machine vehicles, animals, etc.) by machine learning and store the object feature data 132 to the storage 13.

During the map constructing procedure, the processor 10 keeps comparing the colored image captured by the image sensor 11 with the multiple object feature data 132 stored in the storage 13. If one or more pieces of image inside the colored image are matched with the object feature data 132 after comparison, the processor 10 will regard these pieces of image as the aforementioned dynamic objects, and these dynamic object (images) will be labeled by the processor 10. Therefore, the processor 10 may filter these dynamic objects in the upcoming procedure(s).

Figure 3A:
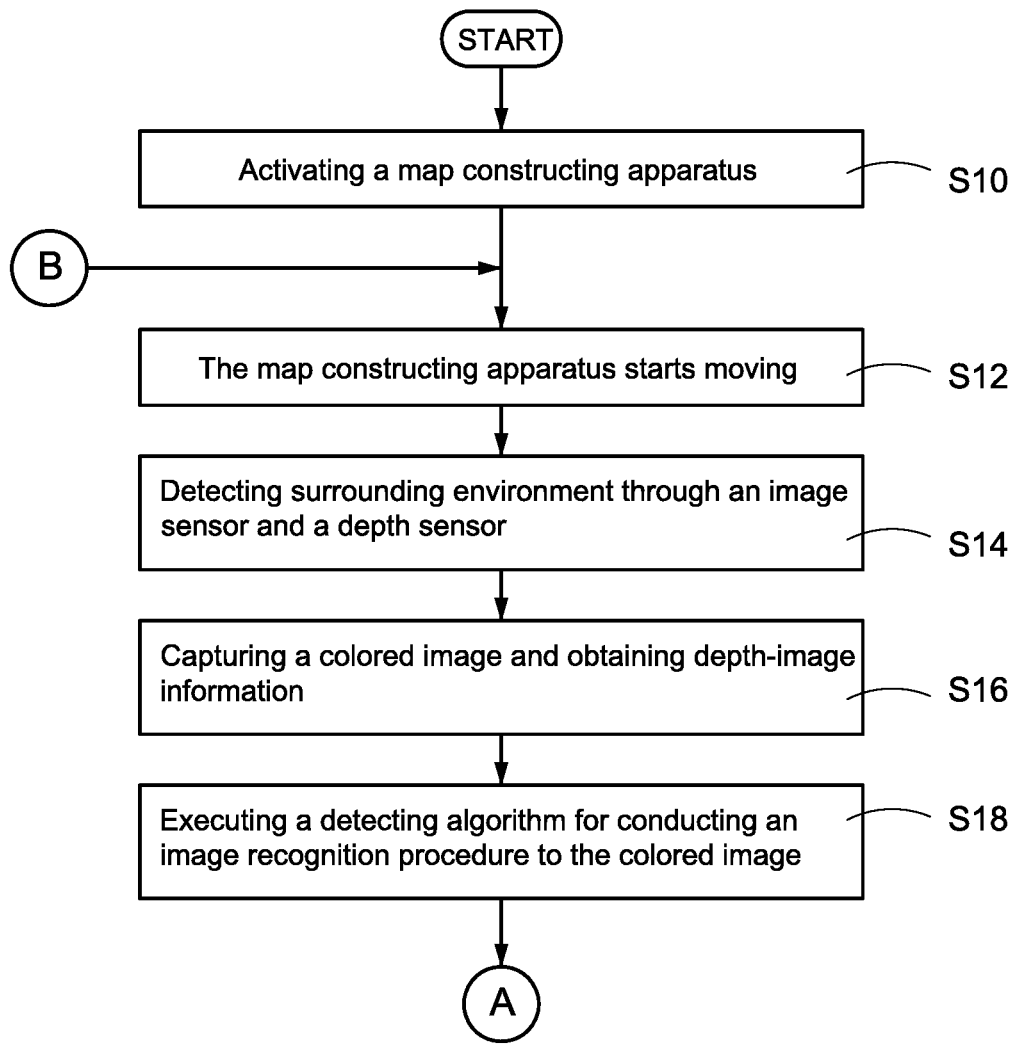
FIG. 3A is a first part of a map constructing flowchart according to a first embodiment of the present invention.
Figure 3B:
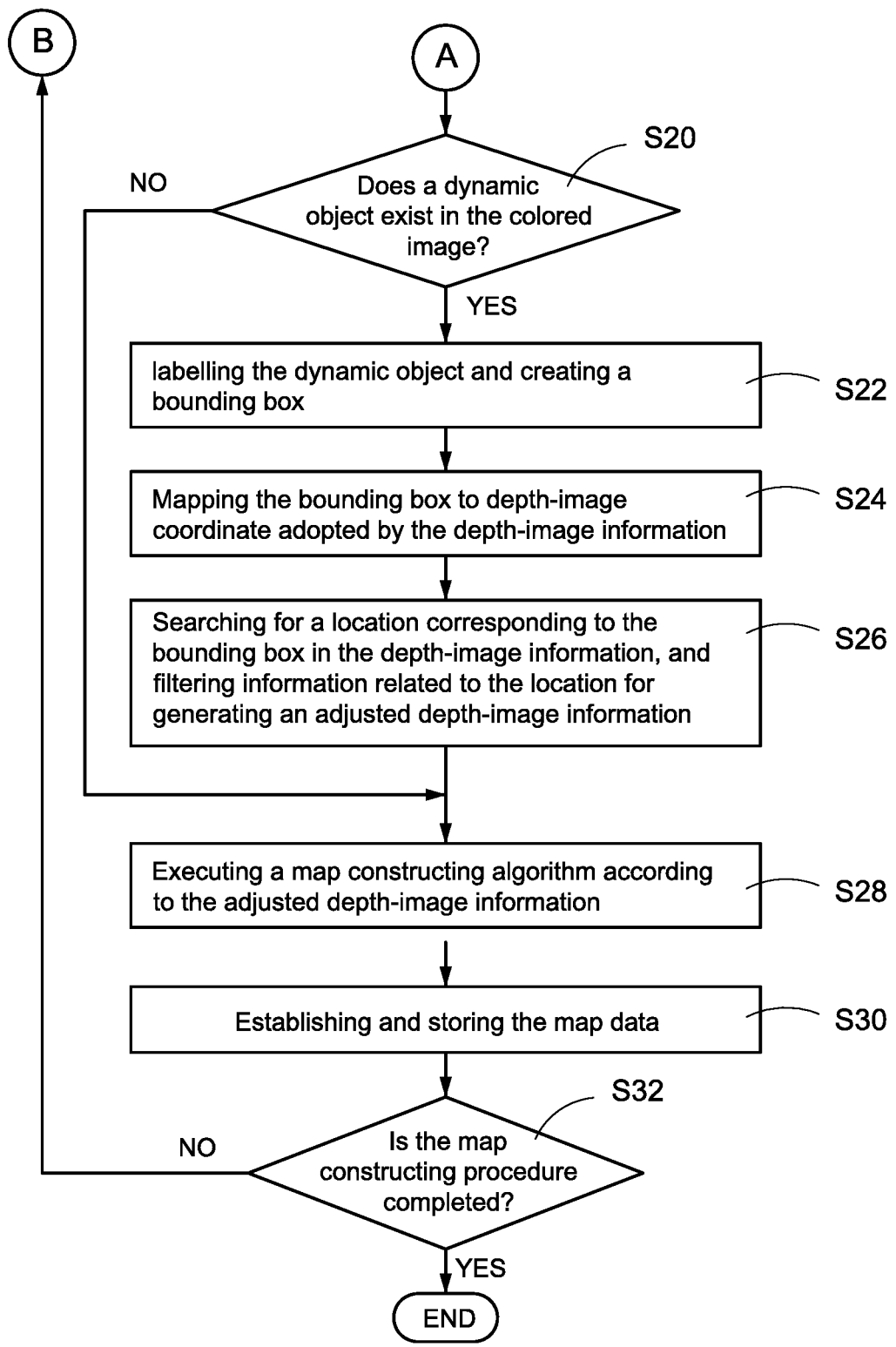
FIG. 3B is a second part of the map constructing flowchart according to a first embodiment of the present invention.

FIG. 3A is a first part of a map constructing flowchart according to a first embodiment of the present invention. FIG. 3B is a second part of the map constructing flowchart according to a first embodiment of the present invention. FIG. 3A and FIG. 3B disclose a map constructing method of the present invention and may be utilized by the map constructing apparatus 1 shown in FIG. 2.

First, the map constructing apparatus 1 is activated when a user needs to build a map (step S10). In particular, the user may directly activate the map constructing apparatus 1, or activate the mobile robot which arranged with the map constructing apparatus 1 for triggering the mobile robot to activate the map constructing apparatus 1.

Next, the map constructing apparatus 1 may start moving after being activated (step S12), for example, the map constructing apparatus 1 may move through the moving component 14, or being conveyed by the mobile robot. While the map constructing apparatus 1 is moving, it may detect the surrounding environment through the image sensor 11 and the depth sensor 12 (step S14). In an embodiment, the image sensor 11 may be, for example, a colored camera (or called an RGB camera). The map constructing apparatus 1 keeps detecting the surrounding environment and capturing the colored image of the surrounding environment through the image sensor 11. In the embodiment, the depth sensor 12 may be, for example, a lidar. The map constructing apparatus 1 keeps detecting the surrounding environment and obtaining the depth-image information of the surrounding environment through the depth sensor 12 (step S16).

Next, the map constructing apparatus 1 may execute the detecting algorithm through the processor 10 for conducting an image recognition procedure to the colored image (step S18), so as to determine whether a dynamic object exists in the colored image (step S20), i.e., whether a dynamic object is existing in the surrounding environment.

As mentioned, the map constructing apparatus 1 may perform machine learning through HOG feature extraction algorithm, SVM algorithm, CNN algorithm, YOLO algorithm, SSD algorithm or other object detecting algorithms that have been well-trained by neural network, individually or in combination, so as to generate and store multiple object feature data 132 corresponding to different object types. In the above step S18, the processor 10 may compare the captured colored image with the object feature data 132, and the processor 10 may regard one or more pieces of image in the colored image that are matched with the object feature data 132 as the dynamic object.

If the processor 10 determines in the step S20 that no dynamic object exists in the colored image, it may establish the map data 131 directly according to the current obtained depth-image information. In other words, the processor 10 may perform the following step S28 in FIG. 3B directly according to the current obtained depth-image information if no dynamic object is existing.

If the processor 10 determines, in the step S20, that at least one dynamic object exists in the colored image, it further labels the dynamic object and creates a bounding box corresponding to the dynamic object on the colored image (step S22). In one embodiment, the processor 10 regards the bounding box as an ROI. In another embodiment, the processor 10 may transform the ROI into a mask for being recognized with the ease in the upcoming procedure. In this embodiment, the processor 10 stores data such as coordinates, pixel information, etc. corresponding to a location of the bounding box (i.e., the ROI or the mask), so the processor 10 may record the location of the bounding box as a foreground part of the colored image and record the location out of the bounding box as a background part of the colored image. Therefore, the processor 10 may effectively segment the colored image into the foreground part and the background part, and filter the foreground part while establishing the map data 131 (detailed described in the following).

After the step S22, the processor 10 maps the bounding box to a depth-image coordinate adopted by the depth-image information (step S24), i.e., a mapping procedure is performed by the processor 10 between the location of the bounding box on the colored image and the depth-image coordinate adopted by the depth-image information. Therefore, while establishing the map data 131 according to the depth-image information, the processor 10 may filter the depth information related to a location corresponding to the bounding box (i.e., the ROI or the mask) from the map data 131 with ease.

Figure 4:
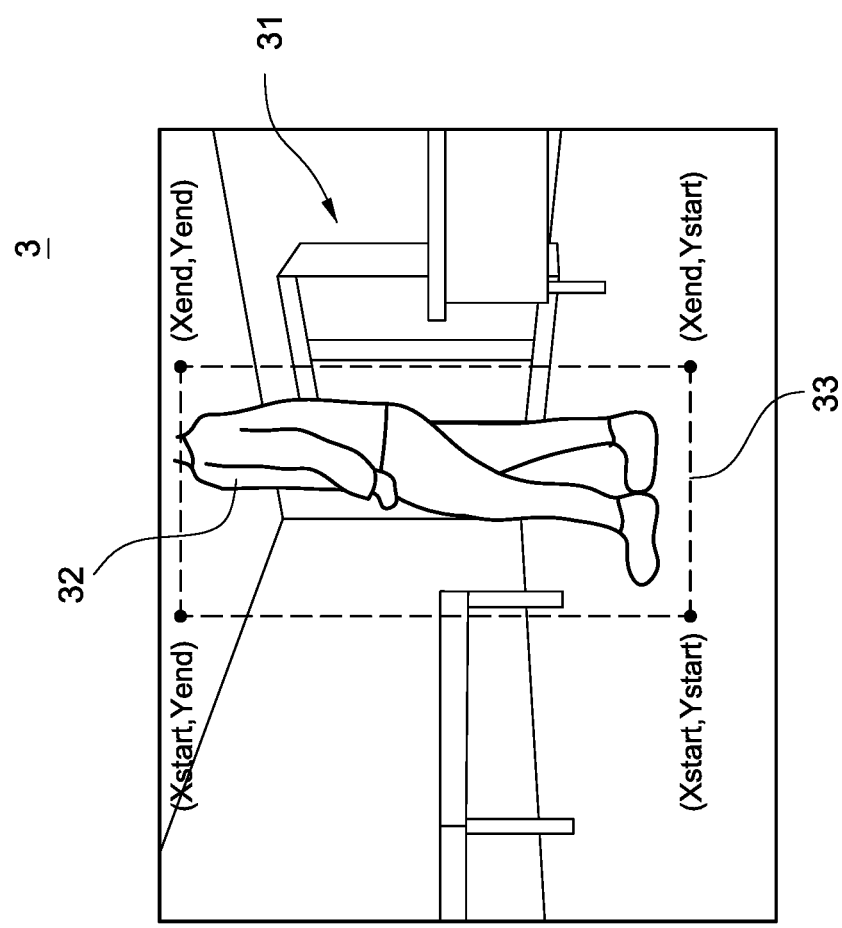
FIG. 4 is a schematic diagram showing a label frame according to a first embodiment of the present invention.

FIG. 4 is a schematic diagram showing a label frame according to a first embodiment of the present invention. A colored image 3 captured by the image sensor 11 is disclosed in FIG. 4. As shown, the colored image 3 basically records a background 31 of the surrounding environment where the map constructing apparatus 1 is located. When the processor 10 recognizes a dynamic object 32 (such as a person in FIG. 4) in the colored image 3 through the detecting algorithm, the processor 10 may create a bounding box 33 which can encompass whole or part of the dynamic object 32 on the colored image 3.

In one embodiment, after recognizing the dynamic object 32, the processor 10 may analyze and obtain an X-axis starting coordinate ($X_{start}$), an X-axis ending coordinate ($X_{end}$), a Y-axis starting coordinate ($Y_{start}$) and a Y-axis ending coordinate ($Y_{end}$) of the dynamic object 32 in the colored image 3, and create the bounding box 33 according to the above coordinates. In other words, the aforementioned ROI/mask is created and transformed based on these coordinates.

Accordingly, when performing the step S24 as shown in FIG. 3B for mapping the bounding box 33 to the depth-image coordinate adopted by the depth-image information, the processor 10 is basically mapping the location of the bounding box 33 consisted of the above coordinates on the colored image 3 to the depth-image coordinate, and set an extreme pixel value to all pixels inside the bounding box 33 for generating a self-defined pixel information (i.e., transforming the ROI into the mask by setting the self-defined pixel information). Therefore, the algorithm performed by the processor 10 may recognize the location corresponding to the bounding box 33 (i.e., the mask) from the depth-image information. In one embodiment, the above extreme pixel value can be set as "0". In another embodiment, the above extreme pixel value can be set as "255". In a further embodiment, the above extreme pixel value can be set as a specific value which is recognizable to the algorithm, not limited thereto.

For an instance, the processor 10 may execute the following source code to generate the aforementioned mask:

```
If Object exists
    For X = X_start to X_end
    For Y = Y_start to Y_end
    Image[X][Y] = Mask Value
    End for X, Y
End if
```

However, the above source code is just one of the exemplary embodiments of the present invention, but not limited thereto.

Please refer back to FIG. 3B. After the step S24, the processor 10 may search for the location corresponding to the bounding box 33 in the depth-image information (for example, searching for the pixels with the extreme pixel value), filter the information related to the bounding box 33 from the depth-image information, and then generate adjusted depth-image information based on the filtering result (step S26). In this embodiment, the adjusted depth-image information does not include the depth information related to the location of the dynamic object 32.

Figure 5A:
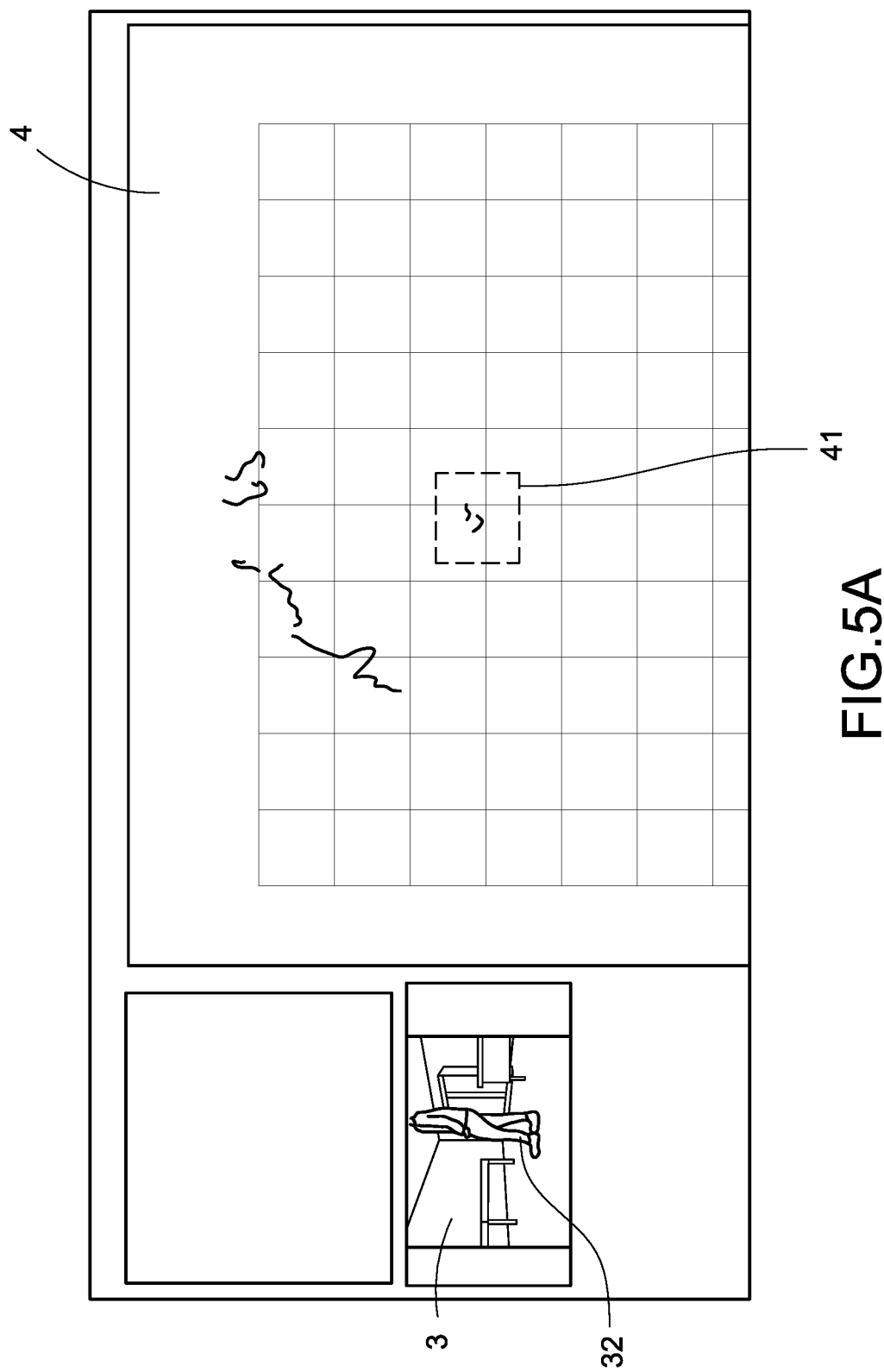
FIG. 5A is a schematic diagram showing depth-image information according to a first embodiment of the present invention.
Figure 5B:
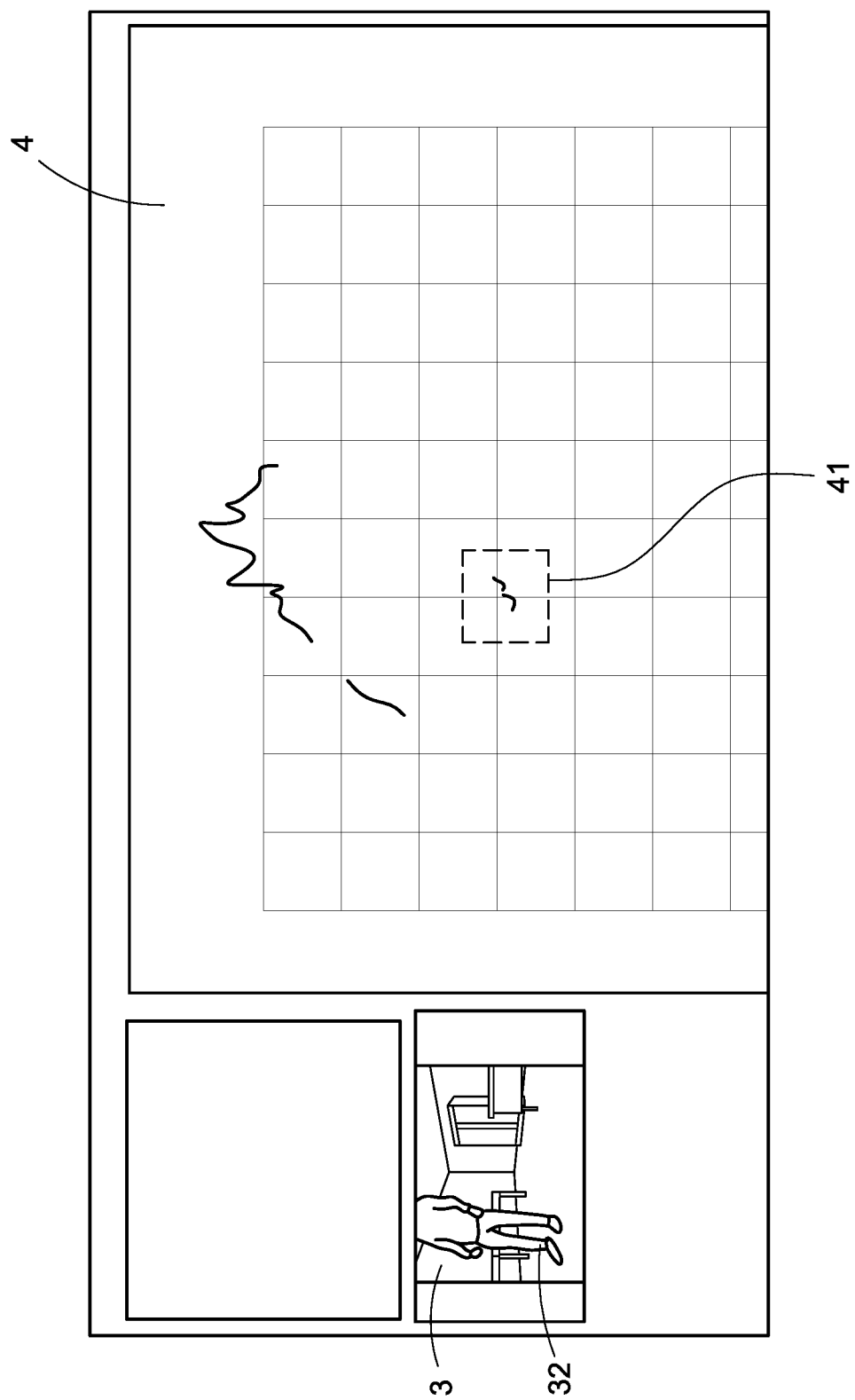
FIG. 5B is a schematic diagram showing depth-image information according to a second embodiment of the present invention.

FIG. 5A is a schematic diagram showing depth-image information according to a first embodiment of the present invention. FIG. 5B is a schematic diagram showing depth-image information according to a second embodiment of the present invention.

As shown in FIG. 5A and FIG. 5B, if the processor 10 does not filter the depth information related to the location of the dynamic object 32 from the depth-image information 4, whenever a dynamic object 32 (such as a person) appears in the colored image 3, object depth information 41 will simultaneously appear in the depth-image information 4 at a corresponding location.

Figure 6:
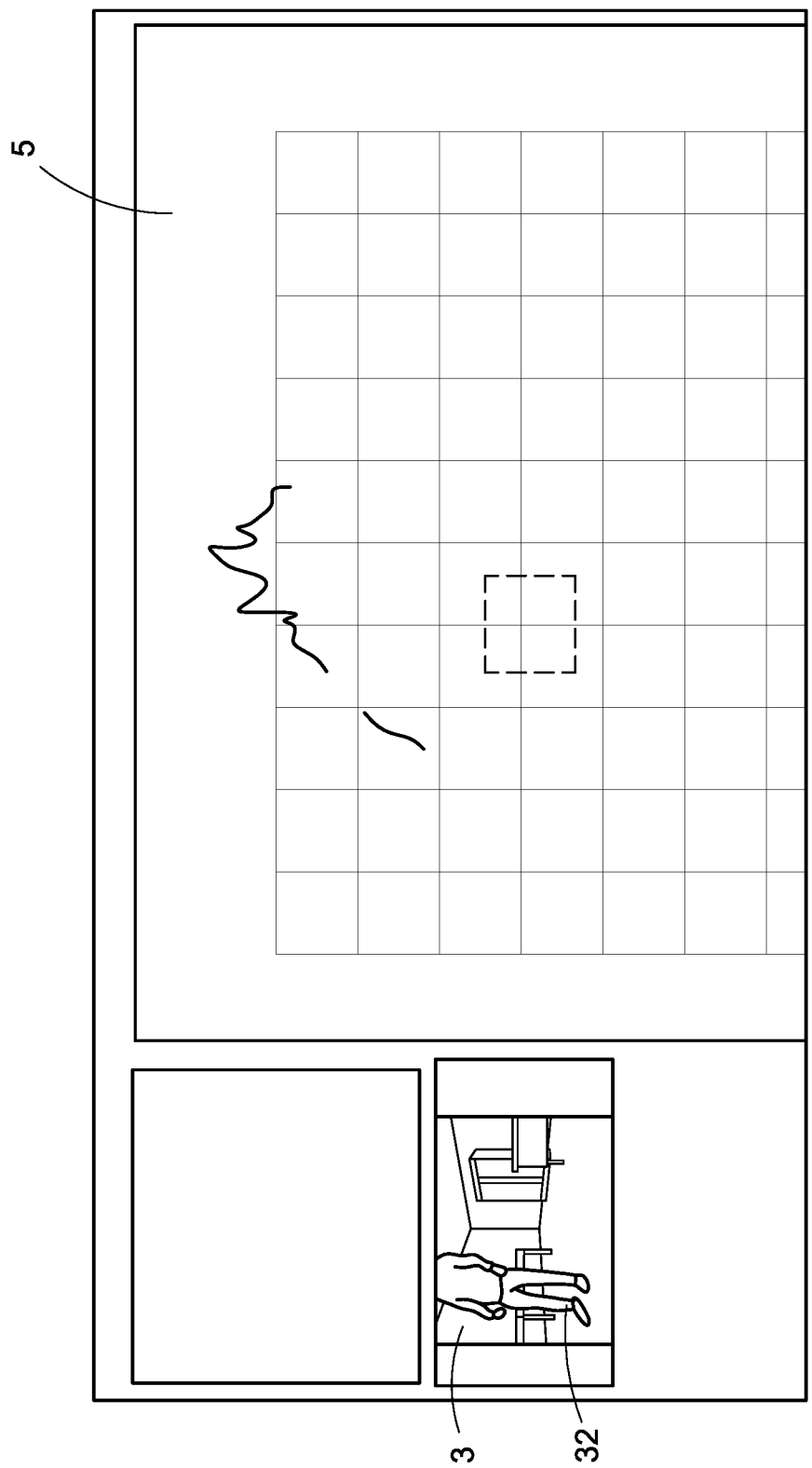
FIG. 6 is a schematic diagram showing adjusted depth-image information according to a first embodiment of the present invention.

FIG. 6 is a schematic diagram showing adjusted depth-image information according to a first embodiment of the present invention.

By applying the map constructing method of the present invention, the processor 10 of the map constructing apparatus 1 may label the dynamic object 32 and create the bounding box 33 to encompass thereto after the dynamic object 32 is recognized. The processor 10 may then map the location of the bounding box 33 to the depth-image coordinate of the depth-image information, and set an extreme pixel value to all pixels inside the bounding box 33. Therefore, the processor 10 may search for the location corresponding to the bounding box 33 from the depth-image information 4 based on the extreme pixel value, and filter the depth information related to this location from the depth-image information 4. As shown in FIG. 6, though the dynamic object 32 still exists in the colored image 3, the depth information related to the location of the dynamic object 32 has already been filtered from the depth-image information 4 (i.e., the adjusted depth-image information 5 has been generated). In other words, the content of the adjusted depth-image information 5 does not include the aforementioned object depth information 41. As a result, the processor 10 may effectively exclude the dynamic object 32 and improve the accuracy of the eventually-built map by establishing the map data 131 according to the adjusted depth-image information 5.

When the processor 10, determines that the dynamic object 32 exists in the colored image 3, it may obtain a scanning range of the depth-image information 4 corresponding to the currently-captured colored image 3 through instructions such as "Get Depth Raw Data". The processor 10 then obtains an object-boundary start point ($DX_{start}$) and an object-boundary end point ($DX_{end}$) of the dynamic object 32 (or the bounding box 33) in the depth-image information, and set the depth information of a scope consisted of the object-boundary start point ($DX_{start}$) and the object-boundary end point ($DX_{end}$) as "0", so as to generate the adjusted depth-image information 5. In particular, the processor 10, in this embodiment, is searching for a range of the aforementioned self-defined pixel information in the depth-image information and setting the depth information inside the range as "0" for generating the adjusted depth-image information 5.

More specific, the above object-boundary start point ($DX_{start}$) and object-boundary end point ($DX_{end}$) are the result generated by the processor 10 after mapping the location of the bounding box 33 to the depth-image coordinate, and the processor 10 is able to confirm the range/scope consisted of the object-boundary start point ($DX_{start}$) and the object-boundary end point ($DX_{end}$) through searching for the extreme pixel value (i.e., the self-defined pixel information, or the so-called mask).

In one embodiment, the processor 10 may execute the following source code for searching and filtering the aforementioned object depth information 41:

```
If Object is exist
  Function Get Depth Daw Data input DY_layer return Range_environment
  For Range = 0 to Rnage_environment
    If Range_environment subtraction DX_start >= Range
    AND Range_environment subtract DX_end <= Range
    Range_environment[Range] = Filter Value
  End for Range
End if
```

In the above source code, $DY_{layer}$ represents the scanning range of the depth-image information, Filter Value may be set as "0" (i.e., a value that makes the object depth information 41 disappear from the depth-image information), but not limited thereto. In another embodiment, the processor 10 may set the Filter Value as a pre-determined value which is recognizable to the algorithm for the algorithm to automatically filter the depth information of this location from the map data 131.

Please refer back to FIG. 3B. After the step S26, the processor 10 may execute a map constructing algorithm according to the adjusted depth-image information 5 (step S28), so as to establish the map data 131. Further, the processor 10 stores the established map data 131 to the storage 13 (step S30). In one embodiment, the processor 10 may store the map data 131 to the storage 13 under a file format such as portable network graphics (PNG), bitmap (BMP) or portable gray map (PGM), but not limited thereto.

In particular, the processor 10 is considering the adjusted depth-image information 5 as one of the input parameters of the map constructing algorithm, so the processor 10 may establish the map data 131 which corresponds to the content of the adjusted depth-image information 5 after executing the map constructing algorithm.

In one of the exemplary embodiments, the map constructing algorithm adopted by the present invention may be, for example, Visual Simultaneous Localization and Mapping (VSLAM) algorithm, and the algorithm can be implemented through triangulation method, Kalman Filter, Particle Filter, Monte Carlo Localization (MCL), Mixture MCL, or Grid-Based Markov, etc., individually or in combination, but not limited thereto.

Figure 7A:
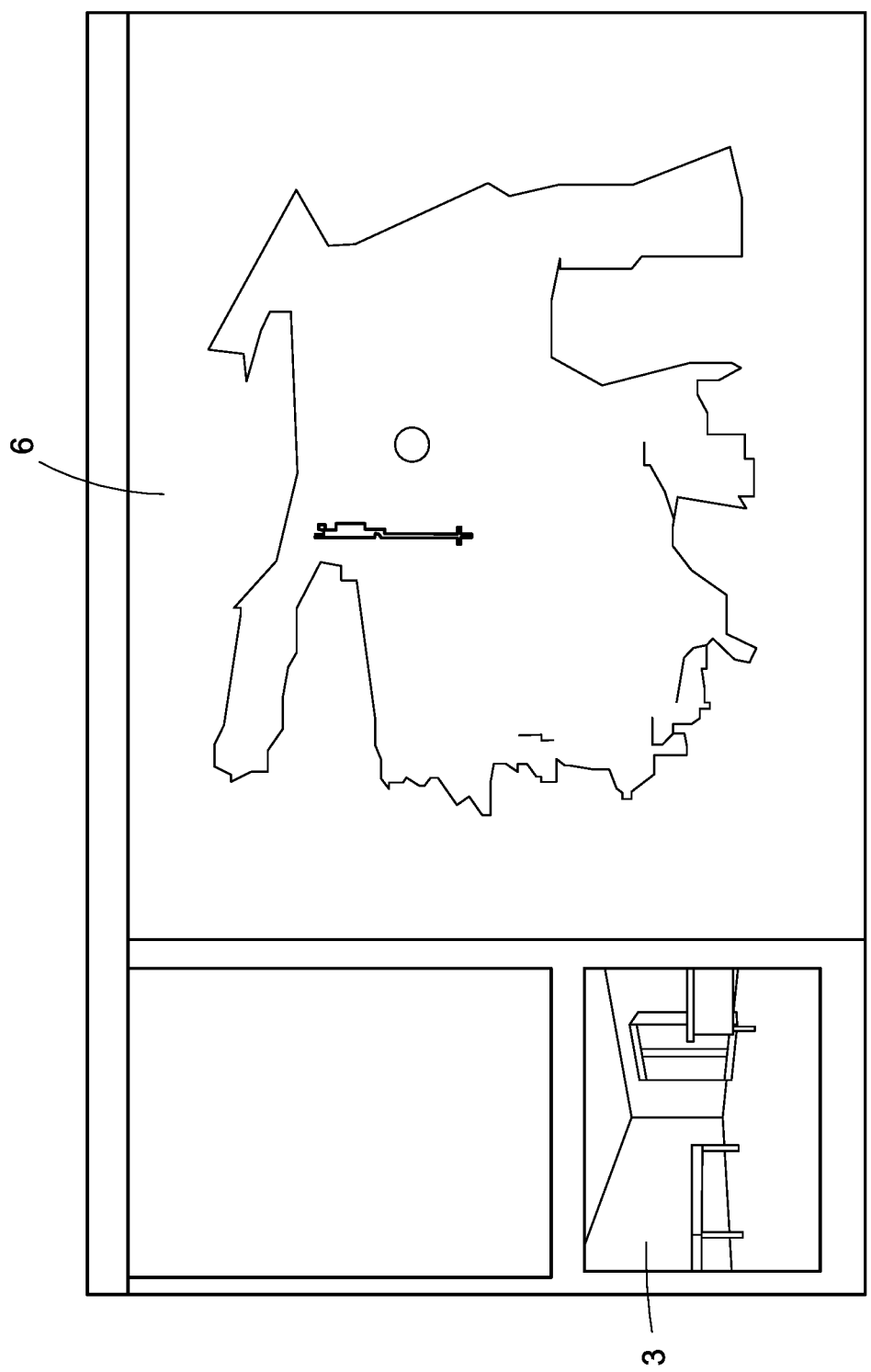
FIG. 7A is a schematic diagram showing a map image according to a first embodiment of the present invention.
Figure 7B:
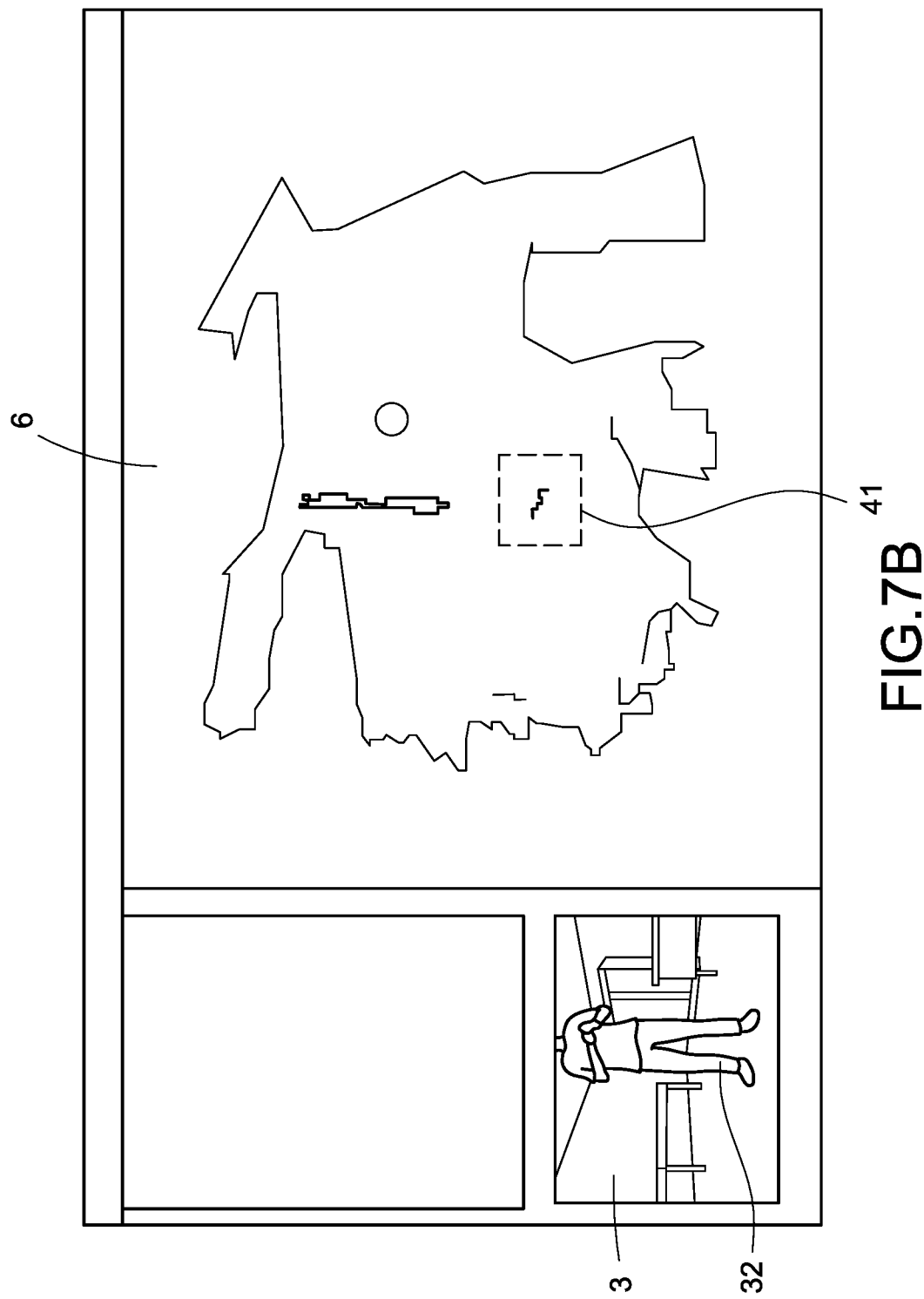
FIG. 7B is a schematic diagram showing a map image according to a second embodiment of the present invention.

Please refer to FIG. 7A and FIG. 7B, where FIG. 7A is a schematic diagram showing a map image according to a first embodiment of the present invention and FIG. 7B is a schematic diagram showing a map image according to a second embodiment of the present invention. In the embodiment of FIG. 7A and FIG. 7B, the processor 10 doesn't perform the searching and filtering procedure for the dynamic object (i.e., doesn't generate the adjusted depth-image information 5). If a dynamic object 32 is recognized by the processor 10 from the colored image 3 (as shown in FIG. 7B), the object depth information 41 will be included and presented in a map image 6 built by the processor 10 at a location corresponding to the dynamic object 32 in the colored image 3. In the embodiment, the processor 10 may perform the aforementioned map constructing algorithm according to the depth-image information 4 for building the map image 6. Therefore, when the map constructing apparatus 1 or the mobile robot moves according to the map image 6 (i.e., the map data 131), it will be avoiding from the location indicated by the object depth information 41 in the map image 6 according to instructions, and it will cause inconvenience while the map constructing apparatus 1 or the mobile robot is moving.

Figure 8A:
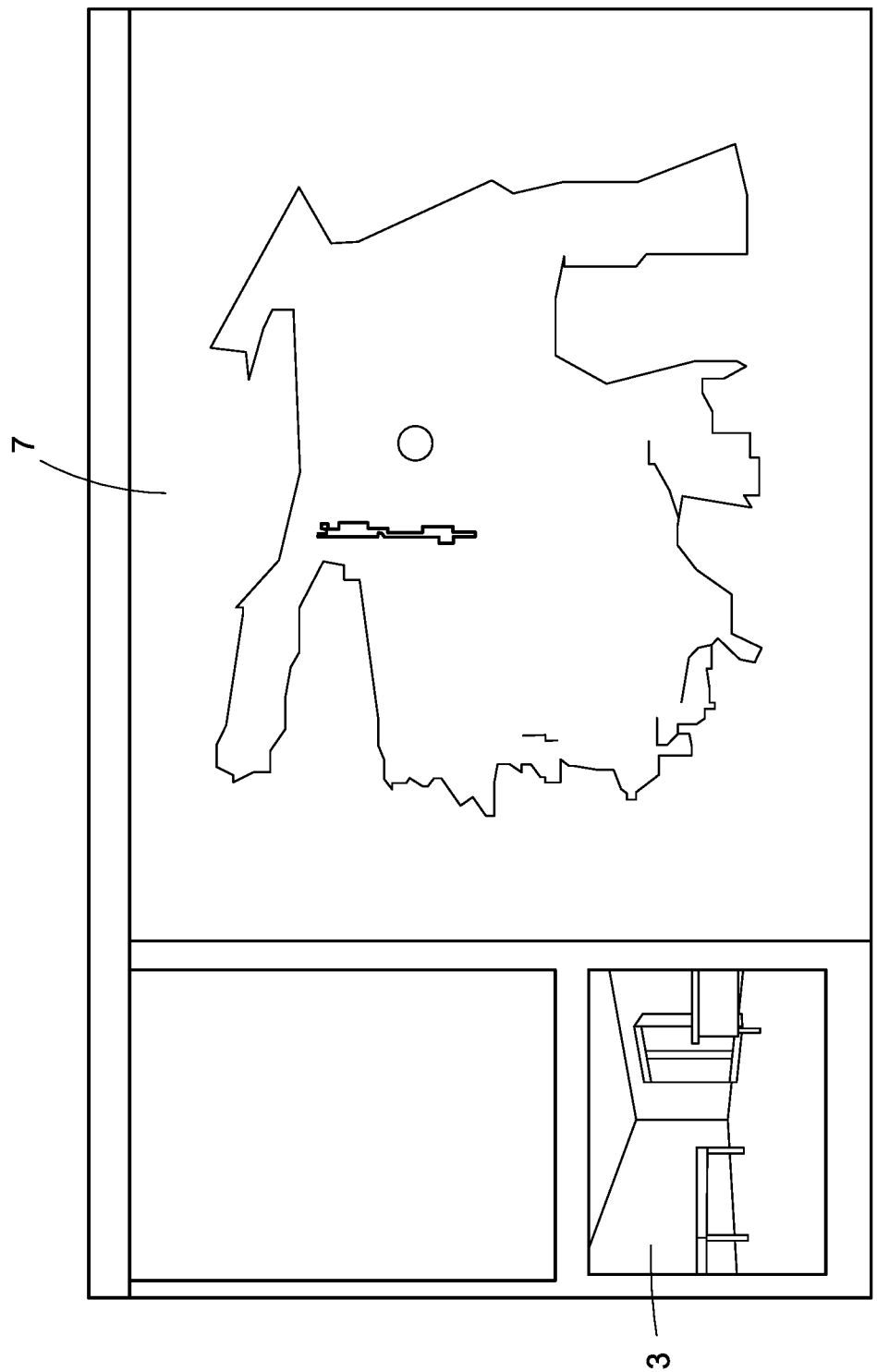
FIG. 8A is a schematic diagram showing a filtered map image according to a first embodiment of the present invention.
Figure 8B:
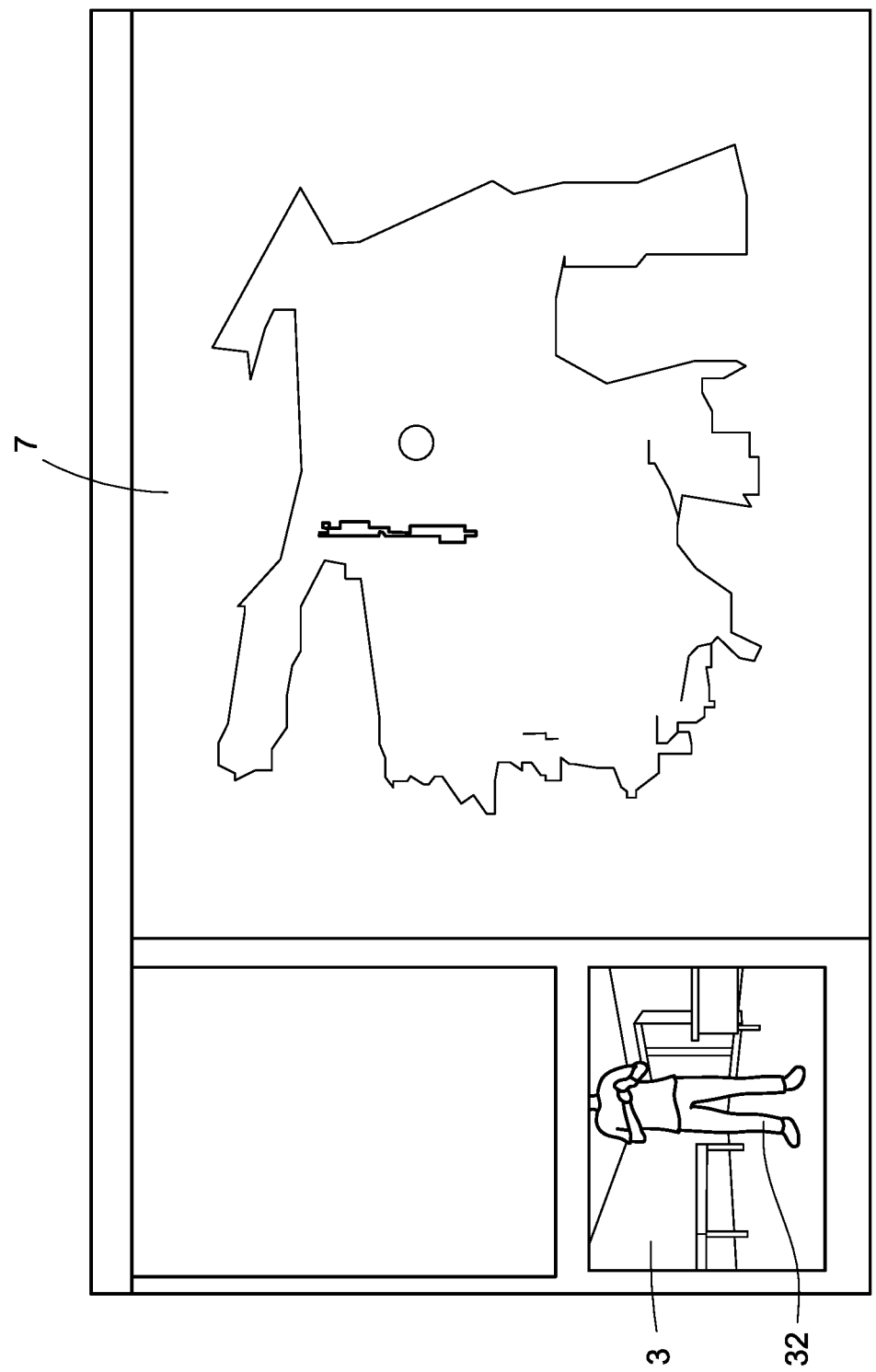
FIG. 8B is a schematic diagram showing a filtered map image according to a second embodiment of the present invention.

Please refer to FIG. 8A and FIG. 8B, where FIG. 8A is a schematic diagram showing a filtered map image according to a first embodiment of the present invention, and FIG. 8B is a schematic diagram showing a filtered map image according to a second embodiment of the present invention. In the embodiment of FIG. 8A and FIG. 8B, the processor 10 is adopted with the map constructing method of the present invention for filtering the object depth information 41 corresponding to the dynamic object 32 from the depth-image information 4, and the adjusted depth-image information 5 will be generated based on the filtered depth-image information 4. If the dynamic object 32 is recognized by the processor 10 from the colored image 3, in this embodiment, the map constructing algorithm of the processor 10 may create a filtered map image 7 according to the adjusted depth-image information 5, and the object depth information 41 corresponding to the recognized dynamic object 32 will not be included and presented in the filtered map image 7. Therefore, when the map constructing apparatus 1 or the mobile robot moves according to the filtered map image 7 (i.e., the map data 131), it won't be affected by the dynamic object 32 existing at the time the filtered map image 7 was built.

Please refer back to FIG. 3B. After the step S30, processor 10 further determines whether the map constructing procedure is completed (step S32), and re-executes the step S12 to the step S30 before the map constructing procedure is completed. Therefore, the map constructing apparatus 1 may keep moving and establishing the map data 131 of the surrounding environment according to the captured colored images and the multiple records of the obtained depth-image information, and stores the established map data 131 for future moving.

It is worth saying that except the aforementioned dynamic object, the position of static objects in the environment may change as well. For example, the arranged position of machines may change, the decoration of the entire space may change, etc. For obviating the above changing, the present invention discloses another technical solution which makes the map constructing apparatus 1 (or the mobile robot arranged with the map constructing apparatus 1) may keep updating the map data 131 according to the above map constructing method while its regular operation, so as to solve a problem that the traditional robots can only move according to a fixed-embedded map.

Figure 9:
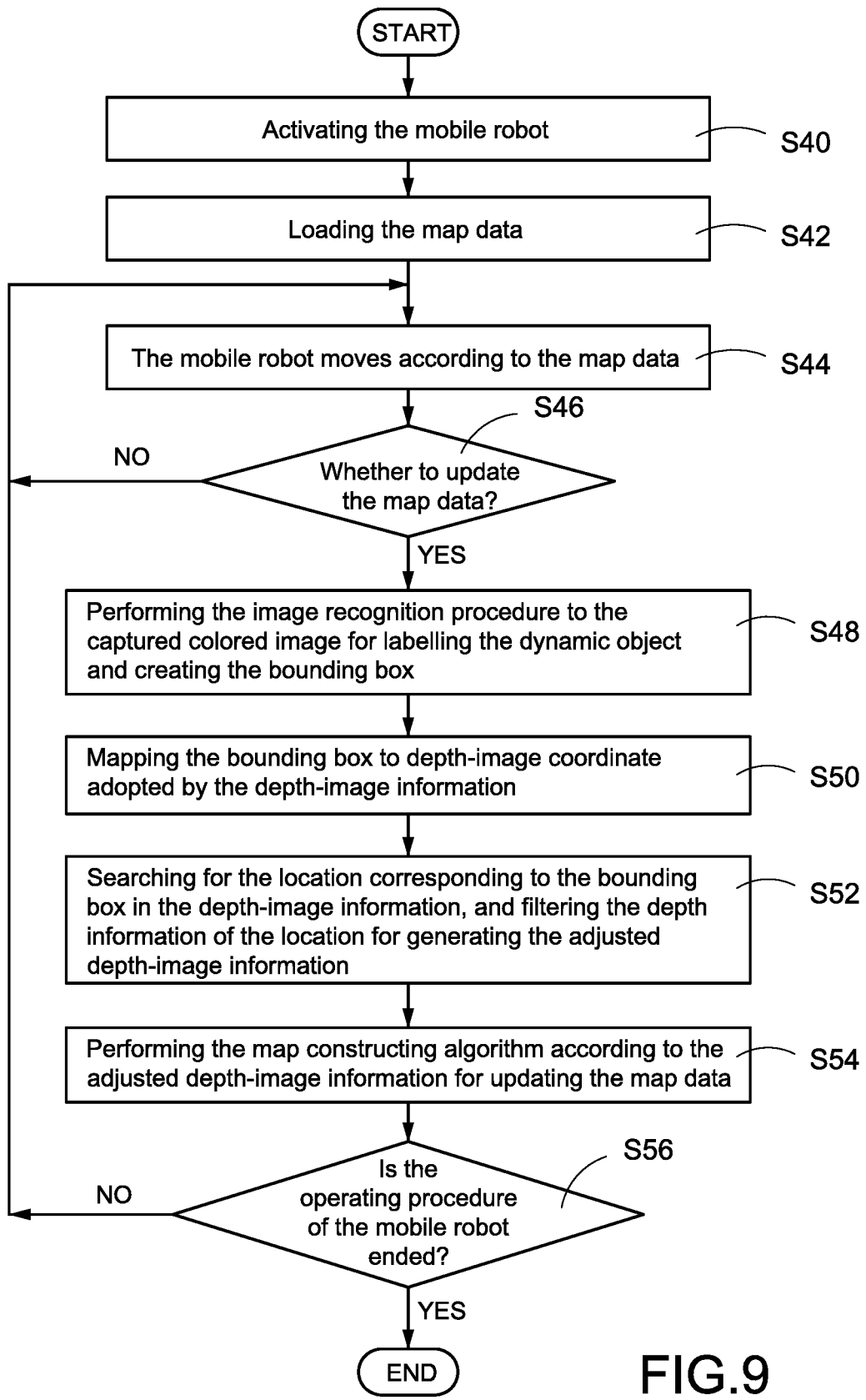
FIG. 9 is a map updating flowchart according to a first embodiment of the present invention.

FIG. 9 is a map updating flowchart according to a first embodiment of the present invention. FIG. 9 discloses a map updating method adopted by a map constructing apparatus capable of moving (such as the map constructing apparatus 1 shown in FIG. 2 which has the moving component 14 and the acting component 15), or adopted by a mobile robot arranged with the map constructing apparatus 1. For the sake of understanding, the mobile robot arranged with the map constructing apparatus 1 will be taken as an example for describing in the following sections.

In the embodiment, the mobile robot stores pre-established map data 131. A user may activate the mobile robot (step S40), and the mobile robot may automatic load the map data 131 after being activated (step S42). In one embodiment, the mobile robot loads the map data 131 from the storage 13 as shown in FIG. 2. In another embodiment, the mobile robot loads the map data 131 from embedded memory, externally-connected hard-drive or wirelessly-connected database, not limited thereto.

After the map data 131 is completely loaded, the mobile robot may start moving in the space according to the instruction of the map data 131 (step S44). In this embodiment, the map data 131 records/describes plane space information related to the space where the mobile robot currently exists.

During the movement, the mobile robot determines whether to update the map data 131 or not through the map constructing apparatus 1 (step S46). In particular, the map constructing apparatus 1 may keep capturing the colored images through the image sensor 11 and keep obtaining the depth-image information through the depth sensor 12 while the mobile robot is moving, and the map constructing apparatus 1 determines whether the map data 131 needs to be updated according to the content of the captured colored images and the obtained depth-image information.

In one embodiment, the map constructing apparatus 1 may determine that the map data 131 need to be updated when a dynamic object is recognized from at least one of the captured colored images. In another embodiment, the map constructing apparatus 1 may determine that the map data 131 need to be updated when the content of the map data 131 is unmatched with the obtained depth-image information. In a further embodiment, the map constructing apparatus 1 may omit the determination in the step S46 and keep updating the map data 131 automatically while the mobile robot is moving. However, the above descriptions are just some of the exemplary embodiments of the present invention, but not intended to narrow the scope of the present invention down to the above embodiments.

If the map constructing apparatus 1 executes the determination of the step S46 and determines that an update procedure is unnecessary to the map data 131, it won't perform any action.

If the map constructing apparatus 1 determines that the map data 131 need to be updated in the step S46, it may perform an image recognition procedure to the captured colored image through the detecting algorithm based on the map constructing method of the present invention, and then labels the dynamic object in the colored image and creates a corresponding bounding box that encompasses the dynamic object (step S48). Next, the map constructing apparatus 1 maps the bounding box to a depth-image coordinate adopted by the depth-image information (step S50), and sets an extreme pixel value to all pixels inside the bounding box for generating self-defined pixel information.

After the step S50, the map constructing apparatus 1 may search for the self-defined pixel information (i.e., the bounding box) in the depth-image information, and filters the depth information of a location corresponding to the bounding box from the depth-image information for generating adjusted depth-image information (step S52). Then, the map constructing apparatus 1 may perform the aforementioned map constructing algorithm according to the adjusted depth-image information for updating the currently-adopted map data 131 (step S54).

It should be mentioned that in the step S54, the map constructing algorithm adopted by the map constructing apparatus 1 may generate one or more sheets of partial map image in an order according to the adjusted depth-image information, and then updates the map data 131 based on the one or more sheets of partial map image. Therefore, the map constructing apparatus 1 may amend only a part of the map data 131 due to actual requirement instead of amending the entire map data 131 at a time, which makes the map updating procedure more flexible.

After the step S54, the mobile robot determines whether its operating procedure ends (step S56). For example, the mobile robot may determine if the tasks appointed by the user through the HMI 16 are all done, if the mobile robot is shut done, if the map constructing apparatus 1 is shut done, if the mobile robot stops moving, etc. If the mobile robot hasn't finished it operating procedure, it goes back to the step S44 for keeping moving and updating the map data 131.

The technical solution disclosed in the present invention may strengthen the ability of the map constructing apparatus 1 in environment recognition, the map constructing apparatus 1 can detect objects which are not regularly existing in the environment, and it can filter all depth information related to the objects from the map it built, so as to improve the accuracy of the map. Besides, by keeping performing the aforementioned technical solution after the map has been built, the map constructing apparatus 1 of the present invention may automatically update the map whenever it realizes that the environment has changed, so as to keep the consistence between the map and the actual environment around the map constructing apparatus 1.

As the skilled person will appreciate, various changes and modifications can be made to the described embodiment. It is intended to include all such variations, modifications and equivalents which fall within the scope of the present invention, as defined in the accompanying claims.

What is claimed is:

1. A map constructing method, adopted by a map constructing apparatus and the map constructing method comprising steps of:
   a) continually capturing a colored image of a surrounding environment through an image sensor and obtaining a depth-image information of the surrounding environment through a depth sensor after the map constructing apparatus is activated;
   b) executing a detecting algorithm by a processor of the map constructing apparatus for performing an image recognition procedure to the colored image to determine whether a dynamic object exists in the colored image;
   c) labelling the dynamic object and creating a bounding box that encompasses the dynamic object when the dynamic object exists in the colored image;
   d) mapping the bounding box in the colored image to a depth-image coordinate adopted by the depth-image information, and generating self-defined pixel information by setting an extreme pixel value to all pixels inside the bounding box in the depth image information;
   e) obtaining a scanning range of the depth-image information through an instruction of GetDepthRawData, and setting the depth information of a scope consisted of an object-boundary start point and an object-boundary end point of the bounding box in the depth-image information as the self-defined pixel information, and searching for a range of the self-defined pixel information in the depth-image information to position the bounding box from the depth-image information, and filtering the positioned bounding box for generating an adjusted depth-image information, wherein depth information of a location corresponding to the positioned bounding box has been filtered from the content of the adjusted depth-image information;
   f) executing a map constructing algorithm by the processor according to the adjusted depth-image information; and
   g) establishing map data for storing in a storage by the map constructing algorithm.

2. The map constructing method in claim 1, wherein the image sensor is an RGB camera, the depth sensor is a lidar.

3. The map constructing method in claim 1, wherein the storage stores multiple object feature data corresponding to different object types, and the step b) is comparing the colored image with the multiple object feature data by the detecting algorithm and regarding a piece of image of the colored image matched with the object feature data as the dynamic object.

4. The map constructing method in claim 3, wherein the detecting algorithm is Histogram of Oriented Gradient (HOG) feature extraction algorithm, Support Vector Machine (SVM) algorithm, Convolutional Neural Network (CNN) algorithm, You Only Look Once (YOLO) algorithm, Single Shot multibox Detector (SSD) algorithm or an object detecting algorithm trained by neural network.

5. The map constructing method in claim 3, wherein the step c) is to obtain an X-axis starting coordinate ($X_{start}$), an X-axis ending coordinate ($X_{end}$), a Y-axis starting coordinate ($Y_{start}$) and a Y-axis ending coordinate ($Y_{end}$) of the dynamic object in the colored image and create the bounding box according to the coordinates ($X_{start}$, $X_{end}$, $Y_{start}$ and $Y_{end}$).

6. The map constructing method in claim 5, wherein the extreme pixel value is 0 or 255.

7. The map constructing method in claim 5, wherein the step e) is to set depth information inside the range of the self-defined pixel information as 0 for generating the adjusted depth-image information.

8. The map constructing method in claim 1, wherein the map constructing algorithm is Visual Simultaneous Localization and Mapping (VSLAM) algorithm and is implemented through triangulation method, Kalman Filter, Particle Filter, Monte Carlo Localization (MCL), Mixture MCL, or Grid-Based Markov.

9. The map constructing method in claim 1, wherein the map data is stored to the storage under a file format of portable network graphics (PNG), bitmap (BMP) or portable gray map (PGM).

10. The map constructing method in claim 1, wherein the map constructing apparatus is arranged in a mobile robot, and the map constructing method further comprises steps of:
   h) loading the map data from the storage and starting moving by the mobile robot;
   i) continually capturing the colored image through the image sensor and obtaining the depth-image information through the depth sensor;
   j) determining whether to update the map data;
   k) executing the detecting algorithm to perform the image recognition procedure to the colored image when determines to update the map data;
   l) labelling a second dynamic object in the colored image and creating a second bounding box that encompasses the second dynamic object;
   m) mapping the second bounding box to the depth-image coordinate adopted by the depth-image information;
   n) searching and filtering the second bounding box from the depth-image information for generating the adjusted depth-image information;
   o) executing the map constructing algorithm according to the adjusted depth-image information; and
   p) establishing a partial map image through the map constructing algorithm and updating the map data based on the partial map image.

11. A map constructing apparatus, comprising:
an image sensor, configured to continually capturing a colored image of a surrounding environment after the map constructing apparatus is activated;
a depth sensor, configured to continually obtaining depth-image information of the surrounding environment after the map constructing apparatus is activated;
a processor electrically connected with the image sensor and the depth sensor, the processor being configured to execute a detecting algorithm for performing an image recognition procedure to the colored image to determine whether a dynamic object exists in the colored image, and the processor labelling the dynamic object of the colored image for creating a bounding box that encompasses the dynamic object when the dynamic object exists, wherein the processor is further configured to map the bounding box to a depth-image coordinate adopted by the depth-image information, to generate self-defined pixel information by setting an extreme pixel value to all pixels inside the bounding box in the depth image information, and to obtain a scanning range of the depth-image information through an instruction of GetDepthRawData, and to set the depth information of a scope consisted of an object-boundary start point and an object-boundary end point of the bounding box in the depth-image information as the self-defined pixel information, and to search for a range of the self-defined pixel information in the depth-image information to position the bounding box from the depth-image information, and to filter the positioned bounding box for generating an adjusted depth-image information and to execute a map constructing algorithm according to the adjusted depth-image information for establishing map data, wherein depth information of a location corresponding to the bounding box is filtered from the content of the adjusted depth-image information; and
a storage electrically connected with the processor, configured to store the map data.

12. The map constructing apparatus in claim 11, wherein the image sensor is an RGB camera, the depth sensor is a lidar.

13. The map constructing apparatus in claim 11, wherein the storage is configured to store multiple object feature data corresponding to different object types, the detecting algorithm is configured and executed to compare the colored image with the multiple object feature data and regard a piece of image of the colored image matched with the object feature data as the dynamic object.

14. The map constructing apparatus in claim 13, wherein the detecting algorithm is Histogram of Oriented Gradient (HOG) feature extraction algorithm, Support Vector Machine (SVM) algorithm, Convolutional Neural Network (CNN) algorithm, You Only Look Once (YOLO) algorithm, Single Shot multibox Detector (SSD) algorithm or an object detecting algorithm trained by neural network.

15. The map constructing apparatus in claim 13, wherein the detecting algorithm is configured and executed to obtain an X-axis starting coordinate ($X_{start}$), an X-axis ending coordinate ($X_{end}$), a Y-axis starting coordinate ($Y_{start}$) and a Y-axis ending coordinate ($Y_{end}$) of the dynamic object in the colored image and to create the bounding box according to the coordinates ($X_{start}$, $X_{end}$, $Y_{start}$ and $Y_{end}$), and the processor is further configured to set depth information of the range of the self-defined pixel information as 0 for generating the adjusted depth-image information.

16. The map constructing apparatus in claim 15, wherein the extreme pixel value is 0 or 255.

17. The map constructing apparatus in claim 11, wherein the map constructing algorithm is Visual Simultaneous Localization and Mapping (VSLAM) algorithm and is implemented through triangulation method, Kalman Filter, Particle Filter, Monte Carlo Localization (MCL), Mixture MCL, or Grid-Based Markov.

18. The map constructing apparatus in claim 11, wherein the map data is under a file format of portable network graphics (PNG), bitmap (BMP) or portable gray map (PGM).

* * * * *